US012215706B2

(12) United States Patent
Freychet et al.

(10) Patent No.: US 12,215,706 B2
(45) Date of Patent: Feb. 4, 2025

(54) ROTARY MACHINE AND PRIMARY MOTOR-PUMP ASSEMBLY PROVIDED WITH THIS ROTARY MACHINE

(71) Applicant: Electricite de France, Paris (FR)

(72) Inventors: Julien Freychet, Rillieux la Pape (FR); Mohand Adjemout, Lucé (FR); Pascal Andre, Sablons sur Huisne (FR); Mohamed-Amine Hassini, Bourg la Reine (FR); Benoit De Laage De Meux, Villejuif (FR)

(73) Assignee: Electricite de France (FR)

( * ) Notice: Subject to any disclaimer, the term of this patent is extended or adjusted under 35 U.S.C. 154(b) by 0 days.

(21) Appl. No.: 18/563,220

(22) PCT Filed: May 11, 2022

(86) PCT No.: PCT/EP2022/062725
§ 371 (c)(1),
(2) Date: Nov. 21, 2023

(87) PCT Pub. No.: WO2022/248220
PCT Pub. Date: Dec. 1, 2022

(65) Prior Publication Data
US 2024/0229813 A1 Jul. 11, 2024

(30) Foreign Application Priority Data
May 27, 2021 (FR) ........................................ 2105496

(51) Int. Cl.
*F04D 29/06* (2006.01)
*F04D 7/08* (2006.01)
(Continued)

(52) U.S. Cl.
CPC ............. *F04D 29/061* (2013.01); *F04D 7/08* (2013.01); *F04D 29/106* (2013.01); *G21C 15/243* (2013.01)

(58) Field of Classification Search
CPC ........ F04D 7/08; F04D 29/061; F04D 29/106; F04D 29/126; G21C 15/243
See application file for complete search history.

(56) References Cited

U.S. PATENT DOCUMENTS

2002/0166317 A1 11/2002 Przytulski et al.
2009/0322031 A1 12/2009 Roche et al.

FOREIGN PATENT DOCUMENTS

JP 2016006339 A 1/2016

OTHER PUBLICATIONS

International Search Report for PCT/EP2022/062725 mailed Sep. 14, 2022. 3 pages.

*Primary Examiner* — David E Sosnowski
*Assistant Examiner* — Jason G Davis
(74) *Attorney, Agent, or Firm* — Lerner David LLP

(57) ABSTRACT

The present invention relates to a rotary machine (10), comprising a casing (32) delimiting an oil compartment (31), a shaft (33), a bearing (22, 23, 24), an oil sealing device (35) located between the rotary portion (360) and the upper portion (320) of the casing (32), characterised in that the oil sealing device (35) comprises at least one groove (52) for drawing in external air in the direction (S) of rotation of the shaft (33), the groove (52) being located in the rotary portion (360) and/or in the upper portion (320) of the housing (32), the rotary portion (360) not being in contact with the upper portion (320), the groove (52) for drawing in external air being configured to draw air from the upstream end (521) to the downstream end (522) towards the compartment (31) when the shaft (33) rotates in the direction (S).

17 Claims, 11 Drawing Sheets

(51) Int. Cl.

| | |
|---|---|
| ***F04D 29/10*** | (2006.01) |
| ***G21C 15/243*** | (2006.01) |

ROTARY MACHINE AND PRIMARY MOTOR-PUMP ASSEMBLY PROVIDED WITH THIS ROTARY MACHINE

CROSS-REFERENCE TO RELATED APPLICATIONS

The present application is a national phase entry under 35 U.S.C § 371 of International Application No. PCT/EP2022/062725 filed May 11, 2022, which claims priority from French Patent Application No. 2105496 filed May 27, 2021, all of which are hereby incorporated herein by reference.

The invention relates to a rotary machine, and to a motor-pump assembly provided with this rotary machine.

The field of the invention generally relates to rotary machines that need to be lubricated with oil. This is for example the case of the motors of water circulation pumps installed in the primary circuit of a nuclear power plant: these circulation pumps and their respective motor will be referred to in the remainder of the text as a primary motor-pump assembly. The fields of application may be extended to turbines, pumps, motors, alternators, and any machinery or machine comprising a rotary shaft.

In general, with reference to FIGS. 1 and 2, a rotary machine 10 known to the prior art comprises a casing 32, a rotary shaft 33 on guide bearings 22, 23, 24 the casing 32 containing a volume 310 of lubrication oil to lubricate the bearings 22, 23, 24. The rotary machine 10 comprises an oil-sealing device 35, located between a rotary part 360 secured to the shaft 33 and an upper part 320 of the casing 32.

In the field of rotary machines 10 of primary motor-pump assemblies formed by a motor mounted in the primary circuit of a nuclear electrical power production plant, sealing devices 35 are known, formed by a system 35 of baffles and labyrinth seals, located between the rotary part 360 and the upper part 320 of the casing 32, as shown in FIGS. 1 and 2.

This device 35 is known as a "sealing device" due to the fact that it offers a function of limitation of lubricant leaks, from the casing 32 to the outside thereof.

This limitation of leaks does not lead to a total seal. However, it is a function of several parameters comprising, for example and without limitation:

- the length of the baffles: the longer they are, the more the limitation of the leaks is improved,
- the number of teeth disposed between the baffle and the rotary part: the greater their number, the more the leak limitation is improved,
- the distance between the rotary part 360 and the ends of the labyrinth teeth: the smaller it is, the more the leak limitation is improved,
- the fluctuations in pressure and speed originating in the rotary members comprising the rotary shaft 33 itself, combined with the presence of an inertia flyweight 36 in the case of a primary motor-pump assembly: the smaller they are, the more the leak limitation is improved.

Thus, one of the problems posed by this known rotary machine 10 with a sealing device 35 with baffles and labyrinths is that the rotation of the shaft 33 and the presence of oil 310 in the casing gives rise to oil leaks to the outside at the level of the sealing device 35 between the shaft 33 and the casing 32. Variations in pressure and turbulence related to the operation of the motor (rotation of the shaft 33 in particular) allow the oil to migrate by diffusion and traverse the sealing device 35 in place. Specifically, the rotation of the shaft 33 in contact with the oil creates oil spray, which escapes via the sealing device 35 between the shaft 33 and the casing 32, forming a leak path, as shown by the arrow F in FIG. 2. The air loaded with oil is thus released into the environment of the rotary machine 10, following the arrow M shown in FIG. 1 and will generate oil pollution on various surfaces and equipment items located near the rotary machine 10.

With reference to FIGS. 1 to 5, in certain of said known rotary machines 10 with a sealing device 35 with baffles and labyrinth seals, provision is made, for the purpose of limiting oil leaks at the level of the device 35, for a device 100 for filtering the air loaded with oil coupled to a motor-fan 101. Said filtering device 100 is intended to ensure the separation of the oil contained in the air. This oil is reinjected into the casing 32. Said motor-fan 101 ensures the depressurization of the casing 32 with respect to the external pressure of the machine generating an air flow coming from the outside of the machine and traversing the sealing device 35 which has the effect of limiting the oil mist 39 rising up from the casing 32 through the sealing device 35.

This known rotary machine 10 has the drawback of requiring a motor-fan/extractor 101 which must be supplied with electricity to operate (or be mechanically driven). This type of motor-fan/extractor 101 has, on the one hand, a high installation cost, particularly in nuclear power plants, due to the great number of components to be installed such as the bays of outgoing power lines, the cables and the command-and-control. On the other hand, such an installation generates additional maintenance costs comprising periodic maintenance of the motor-fan/extractor 101 (replacement of bearings, mechanical servicing). And finally, such an installation generates high operating costs due to the high electrical power consumption of the motor-fan.

Furthermore, the dynamic seal of the primary pump motor bearings has undergone several modifications (comprising the shape of the labyrinth 35, an increase in the number of their teeth, the addition of fins under the cowl 38 of the inertia flywheel 36). However, these modifications do not guarantee a low level of oil leakage.

The aim of the invention is to obtain a rotary machine and a primary motor-pump assembly provided with this rotary machine, which solves the problem mentioned above and makes it possible to robustly limit, or even to eliminate oil leaks via the sealing device between the shaft and the casing.

For this purpose, a first subject of the invention is a rotary machine, comprising a casing, at least one rotary shaft rotary along a prescribed direction of rotation, at least one guide bearing, which is mounted in the casing and in which the rotary shaft is rotatably mounted,

- the casing delimiting a compartment intended to contain a volume of air and a volume of lubrication oil to lubricate the bearing,
- the rotary machine comprising a rotary part, fixed in rotation to the rotary shaft and surrounded by an upper part of the casing transversally to the rotary shaft and distant from the bearing, an oil-sealing device, located between the rotary part and the upper part of the casing, and a device for filtering the air of the compartment and discharging the air to the outside of the compartment, characterized in that

- the oil-sealing device comprises at least one outside air suction grooving in the direction of rotation of the shaft,
- the grooving being located in the rotary part and/or in the upper part of the casing,
- the rotary part having no contact with the upper part of the casing, the grooving extending from an air suction upstream end, of the rotary part and/or of the upper part of the casing, to an air ejection downstream end, of the rotary part and/or of the upper part of the casing, the air suction upstream end being located on a side of an air communication opening of the rotary machine with the outside and the air ejection downstream end being in communication with the compartment, the outside air suction grooving being configured to suction air from the upstream end to the downstream end toward the compartment when the shaft rotates in the prescribed direction of rotation.

Owing to the invention, the rotation of the shaft in the prescribed direction creates in the grooving a counter-current of air, which comes from outside, passes from the upstream end to the downstream end in the sealing device between the casing and the rotary part toward the oil compartment of the casing, and enters from the downstream end into the oil compartment of the casing against the oil mist, having been generated in the casing by the rotation of the shaft. This means that the oil mist generated in the casing by the rotation of the shaft is confined inside the oil compartment of the casing. This makes it possible to make savings, in some cases, on the use of a motor-fan air extractor. The invention makes it possible to incorporate a stand-alone device able to set in motion and deviate the air flows from the outside to the inside at the level of the sealing device.

From the prior art, sealing devices are known such as contact seals (radial or axial, for example a lip seal) or a mechanical seal which has the advantage of having a low leakage rate. However, these known devices have the following drawbacks, rendering them incapable of solving the problem mentioned above with an adequate lifetime of these seals for a high peripheral speed of the shaft at these seals, particularly in primary motor-pump assemblies of nuclear power plants:

the peripheral speed (peripheral speed='shaft radius'× 'speed of rotation') is too high for the type of application on the primary pump motor, in which this speed is at least 35 m/s and in practice these known contact seals have a limit of approximately 20 m/s (or even up to 100 m/s for very specific applications), the lifetime of these known seals is not adequate (wear related to friction generated by the shaft-seal contact) to guarantee an operation of over 25 years without maintenance: on the diametrically smallest rotary part, the known seal would need to have a resistance without deterioration of more than 25 000 000 km between two engine maintenances which does not exist on the market at this time (limited to approximately 4 000 000 km currently).

On the contrary, the invention makes it possible to solve the problem mentioned below with an adequate lifetime of the sealing device for a high peripheral speed of the shaft at the level of this sealing device, particularly in the primary motor-pump assemblies of nuclear power plants.

According to an embodiment of the invention, the rotary shaft is vertical, the air suction upstream end is an air suction upper end, and the air ejection downstream end is an air ejection lower end.

According to an embodiment of the invention, the outside air suction grooving is inclined at a predetermined non-zero angle of inclination with respect to a plane transversal to the shaft and extends around a direction of extension of the shaft, around which the shaft is able to rotate in the prescribed direction of rotation.

According to an embodiment of the invention, the predetermined non-zero angle of inclination with respect to the transversal plane is greater than 0° and less than or equal to 60°.

According to an embodiment of the invention, the predetermined non-zero angle of inclination with respect to the transversal plane is greater than or equal to 1° and less than or equal to 45°.

According to an embodiment of the invention, the depth of the grooving in a plane transversal to the shaft is greater than 0 mm and less than or equal to 30 mm.

According to an embodiment of the invention, the length of the grooving along a direction of extension of the shaft, around which the shaft is able to rotate in the prescribed direction of rotation, is greater than 0 mm and less than or equal to 200 mm.

According to an embodiment of the invention, the grooving comprises a number of grooves greater than or equal to 1 and less than or equal to 150 along a direction of extension of the shaft, around which the shaft is able to rotate in the prescribed direction of rotation.

According to an embodiment of the invention, the radial clearance between the outer diameter of the rotary part and the inner diameter of the upper part is greater than 0 mm and less than or equal to 6 mm.

According to an embodiment of the invention, the outside air suction grooving is in the form of a threading from the air suction upstream end to the air ejection downstream end in the prescribed direction of rotation.

According to an embodiment of the invention, the outside air suction grooving is helicoidal.

According to an embodiment of the invention, the device for filtering the air of the compartment and discharging the air to the outside of the compartment comprises an air inlet connected to an air outlet of the compartment, a filtered oil outlet, connected to an oil inlet of the compartment, and a filtered air ejection outlet, vented to the outside of the compartment.

According to another embodiment of the invention, the device for filtering the air of the compartment comprises an air inlet connected to an air outlet of the compartment, a filtered oil outlet, connected to an oil inlet of the compartment, and a filtered air ejection outlet, connected to an air suction inlet of a motor-fan for extracting air to the outside of the compartment.

According to an embodiment of the invention, the filtered oil outlet is connected to the oil inlet of the compartment by way of at least one oil duct comprising at least one gooseneck pointing downward.

A second subject of the invention is a primary motor-pump assembly, intended to be mounted in at least one pressurized-water primary circuit of a nuclear electrical power production plant, the primary motor-pump assembly comprising a primary pump having a water-pumping wheel, and a rotary machine as described above, the rotary shaft of which is attached to the pumping wheel of the primary pump to rotationally drive it.

A third subject of the invention is a primary motor-pump assembly as described above, characterized in that the primary motor-pump assembly comprises an inertia flywheel attached to the rotary shaft, the rotary part is an annular wall secured to the inertia flywheel and extending around the rotary shaft.

The invention will be better understood on reading the following description, given solely by way of non-limiting example with reference to the figures below of the appended drawings.

Figure 1:
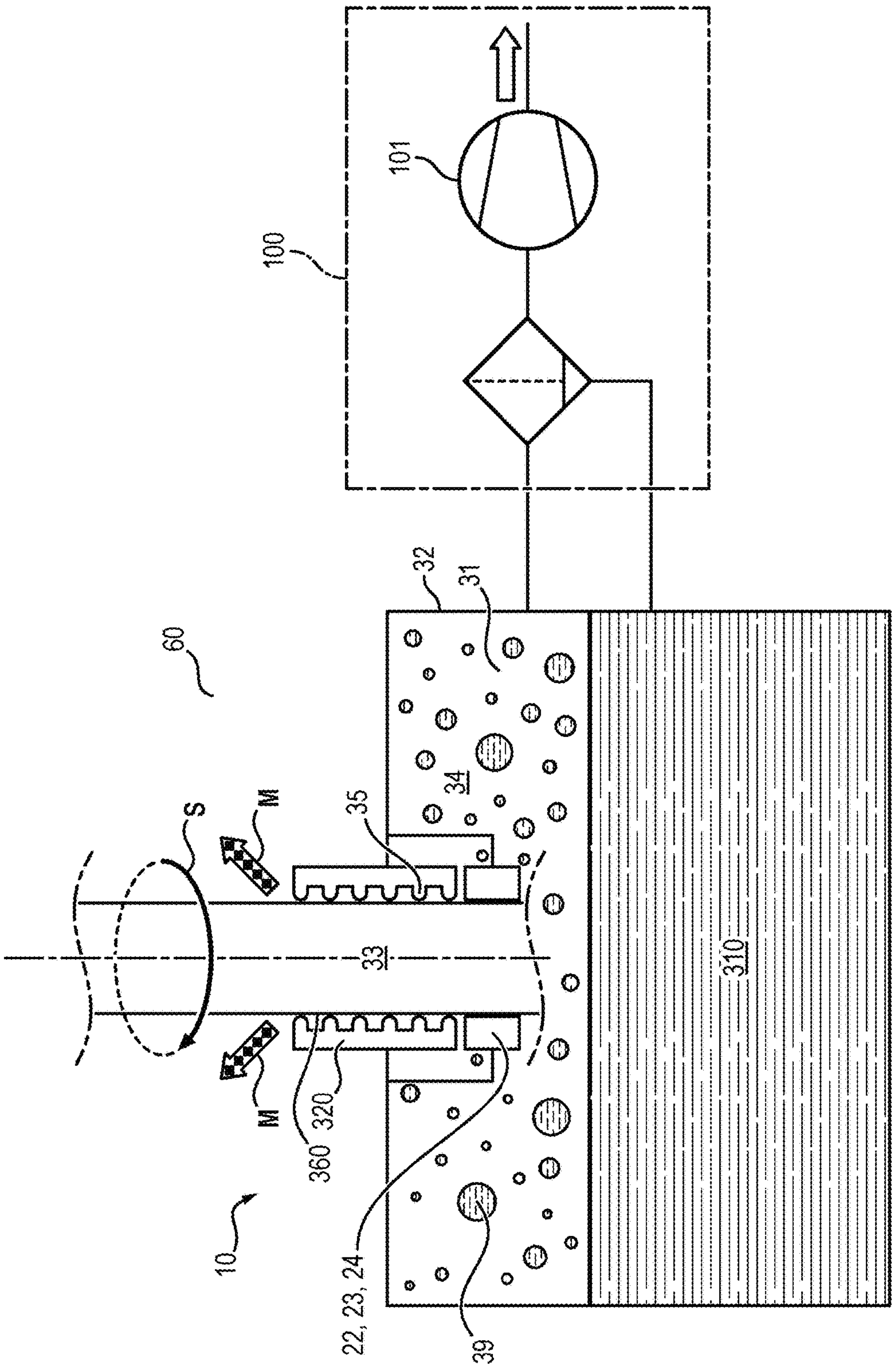
Prior Art FIG. 1
FIG. 1 shows a schematic vertical section view of a known rotary machine.

In general, in FIGS. 1 to 13, the rotary machine 10 according to the invention comprises a casing 32, at least one rotary shaft 33 rotary in a prescribed direction S of rotation, at least one guide bearing 22, 23, 24, which is mounted in the casing 32 and in which the rotary shaft 33 is rotatably mounted. In an embodiment of the invention, the rotary machine 10 is able to operate as a motor. In another embodiment of the invention, the rotary machine 10 can operate as a generator. The rotary shaft 33 is able to rotate about a direction D of extension of the shaft 33 in the prescribed direction S of rotation. The casing 32 delimits a compartment 31 intended to contain a volume 34 of air and a volume of liquid lubrication oil 310 to lubricate the bearing 22, 23, 24. The rotary machine 10 incudes a rotary part 360, fixed in rotation to the rotary shaft 33. The rotary part 360 surrounds the rotary shaft 33 and can be annular around the direction D of extension of the shaft 33 and for example circular cylindrical around this direction D. The rotary machine 10 comprises a passage 50 of the shaft 33 in the casing 32. In this passage 50, the rotary part 360 faces and is surrounded by an upper part 320 of the casing 32 transversally to the rotary shaft 33 and at a distance from the bearing 22, 23, 24. The upper part 320 of the casing 32 can be annular around the direction D of extension of the shaft 33 and can be circular cylindrical around this direction D. The rotary machine 10 comprises an oil-sealing device 35, located between the rotary part 360 and the upper part 320 of the casing 32, and a device 100 for filtering the air of a compartment 31, which is intended to separate the air from the oil. The oil-sealing device 35 is located distant from the bearing 22, 23, 24. The shaft 33 traverses the casing 32 and the oil-sealing device 35. According to an embodiment of the invention, the air filtering device 100 is configured to reinject the oil, having been caught in this filtering device 100, into the volume of oil 310.

In FIGS. 3, 4, 5 and 12, an example of use of the rotary machine 10 according to the invention is a primary motor-pump assembly 2, mounted in the primary circuit 20 of a nuclear electrical power production plant. The primary motor-pump assembly 2 comprises a primary pump 28 having a water-pumping wheel 280 and the rotary machine 10 according to the invention, operating as a motor. The rotary shaft 33 is attached to the pumping wheel 280 of the primary pump 28 so that the rotation of the shaft 33 drives the rotation of the pumping wheel 280. Of course, the rotary machine 10 according to the invention could be used elsewhere than in a primary motor-pump assembly 2. Other examples of use are seal of turbine bearings, alternators, pumps, and motors.

Figure 3:
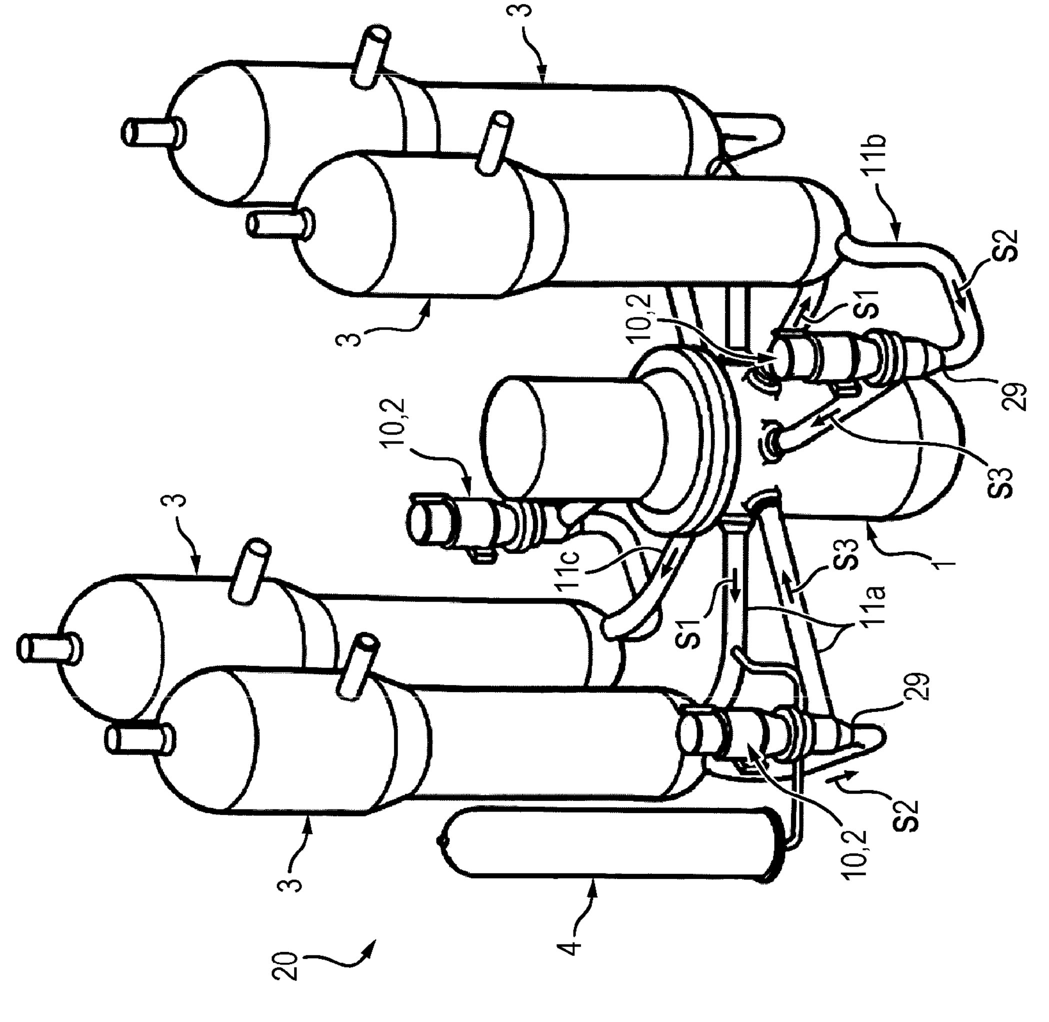
FIG. 3 shows a schematic perspective view of a primary circuit of a nuclear electrical power production plant in which is assembled the rotary machine according to an embodiment of the invention.

In FIG. 3, the primary water circulation circuit 20 of the nuclear power plant, for example with a pressurized water reactor, comprises one or more primary water circulation loops 11*a*, 11*b*, 11*c*, which are connected to a water tank 1. In each primary water circulation loop 11*a*, 11*b*, 11*c* is located a primary motor-pump assembly 2, a water vapor generator 3 to send water successively from the tank 1 to the vapor generator 3 (along the direction S1 of circulation of the water), then from the vapor generator 3 to an upstream water inlet duct 29 of the primary motor-pump assembly 2 (along the direction S2 of circulation of the water), and finally from a downstream water outlet duct 30 of the primary motor-pump assembly 2 (along the direction S3 of circulation of the water) to the tank 1. One of the primary loops 11*a*, 11*b*, 11*c*, for example the primary loop 11*a*, comprises a water pressurizer 4 intended to control the pressure throughout the primary circuit 20.

Figure 4:
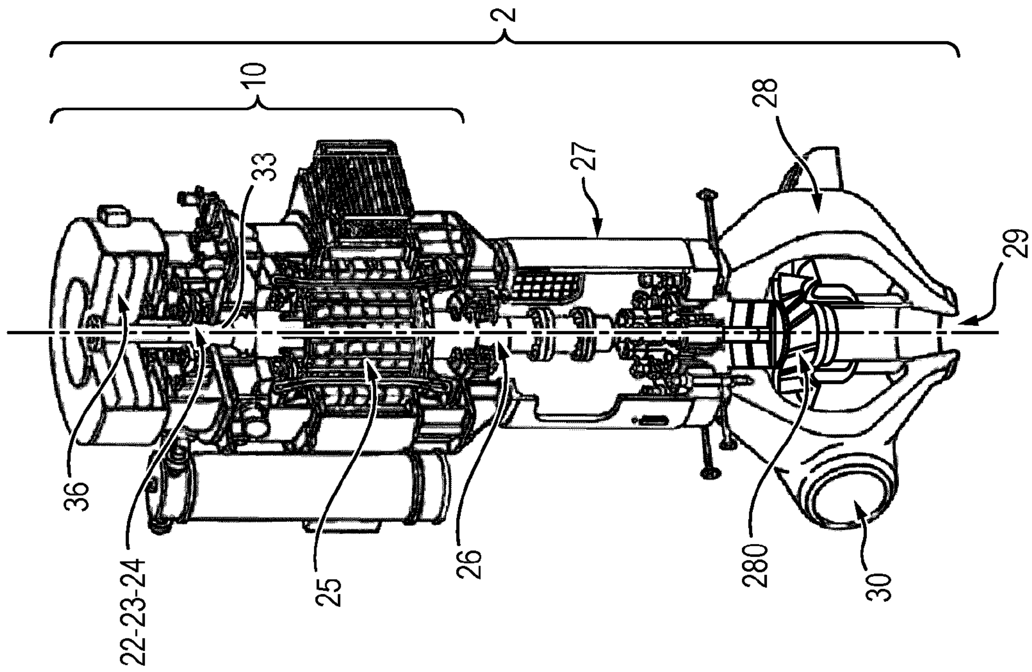
FIG. 4 shows a schematic open perspective view of a primary motor-pump assembly of the primary circuit of FIG. 3, comprising the rotary machine according to an embodiment of the invention.

An example of a primary motor-pump assembly 2 comprising the rotary machine 10 operating as a motor is shown in more detail in FIG. 4 and comprises, from top to bottom:

- an inertia flywheel 36, attached to an upper part of the rotary shaft 33,
- the upper guide bearing 22, 23, 24, formed by the upper radial guide bearing 22 and by a double stop, namely the axial stop lower bearing 24 and the axial stop upper bearing 23,
- a rotor-stator assembly 25, the rotor of which is attached to a median part of the rotary shaft 33 and the stator of which is attached to the casing 32, the stator being able to rotationally drive the rotor and the rotary shaft 33,
- the lower radial guide bearing 26,
- a motor support 27, attached to the lower part of the motor frame 32,
- a primary pump 28 composed of its volute, its pumping wheel 280, its diffuser, and its sealing device and its pivoting members.

The lower bearing 26 has its own oil casing (different from the upper bearing 22, 23, 24) and its own oil and is therefore not concerned by the leakage problems according to the invention (distinct from that of the upper bearing).

According to FIGS. 1 to 13, to ensure the operation of the rotary machine 10 (and of the primary motor-pump assembly 2 in the case where the rotary machine 10 is used therein) and limit friction, the pivoting members 22, 23, 24 of the rotary machine 10 such as the radial guide bearings 22 and the axial stop bearings 23, 24 are lubricated by the oil 310 located in the compartment 31 of the casing 32.

In operation, with reference to FIGS. 1 to 13, an oil mist 39 is generated due to the rotation of the shaft 33 and due to the operation of the bearings 22, 23, 24, in particular the upper guide bearing 22, so much so that the air 34 located above the level 313 of oil 310 in the compartment 31 is loaded with a fine mist 39 of oil and oil vapor. More than 95% of the oil droplets of this mist 39 have a size between 0.15 and 1.0 μm.

Figure 5:
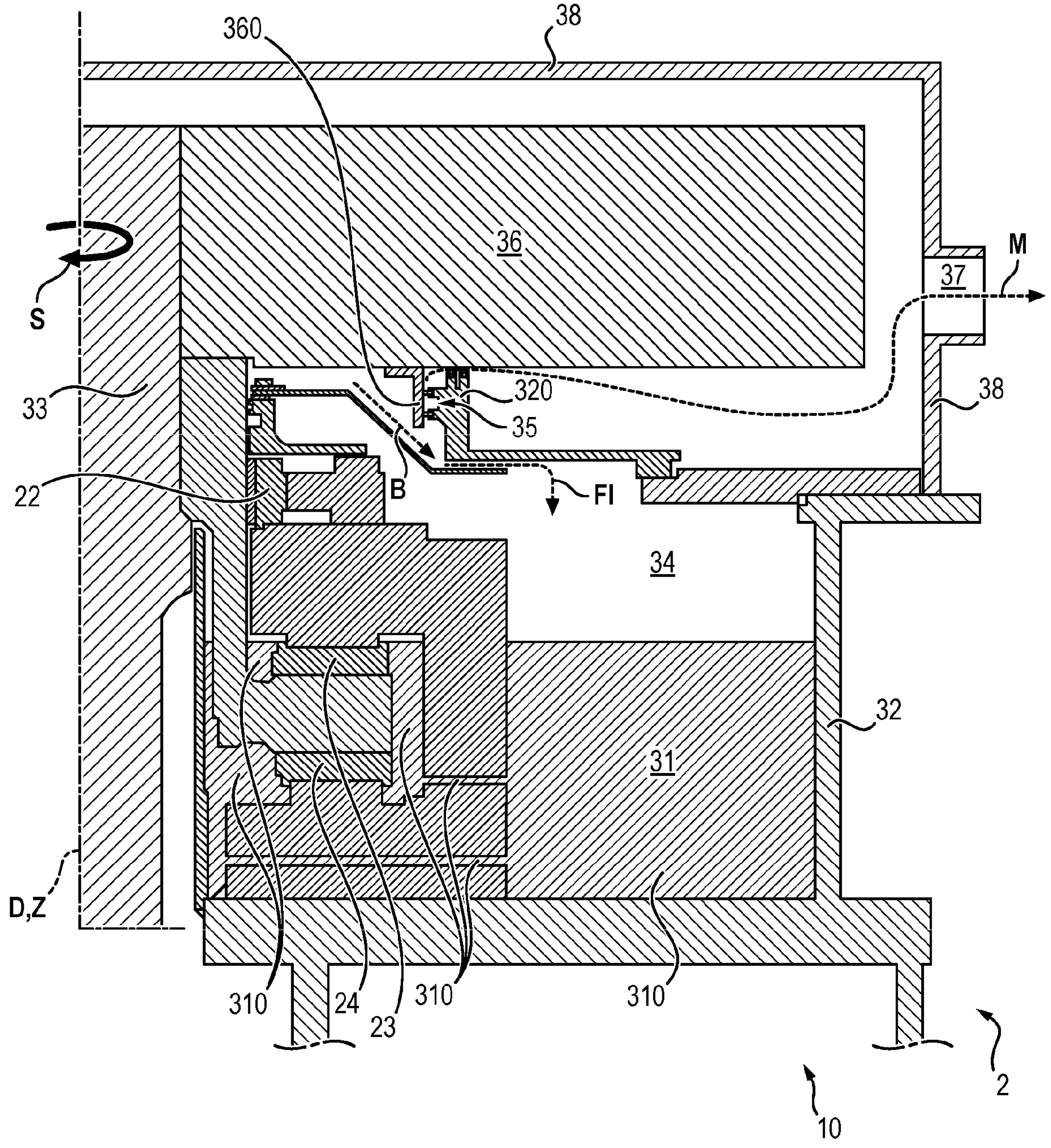
FIG. 5 shows a schematic vertical section view of a part of the rotary machine of FIG. 4 of the prior art.
Figure 6:
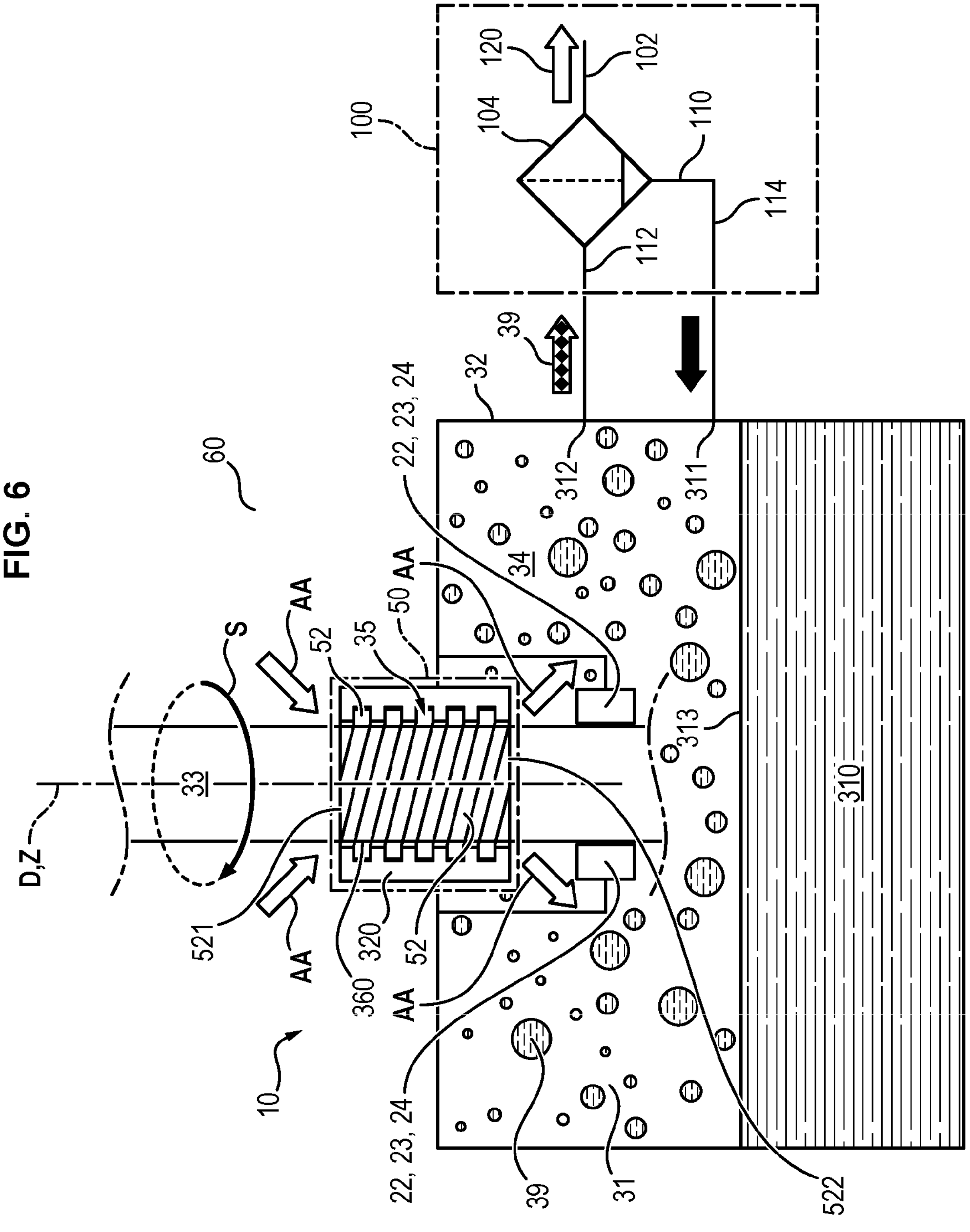
FIG. 6 shows a schematic vertical section view of a part of the rotary machine according to an embodiment of the invention.
Figure 7:
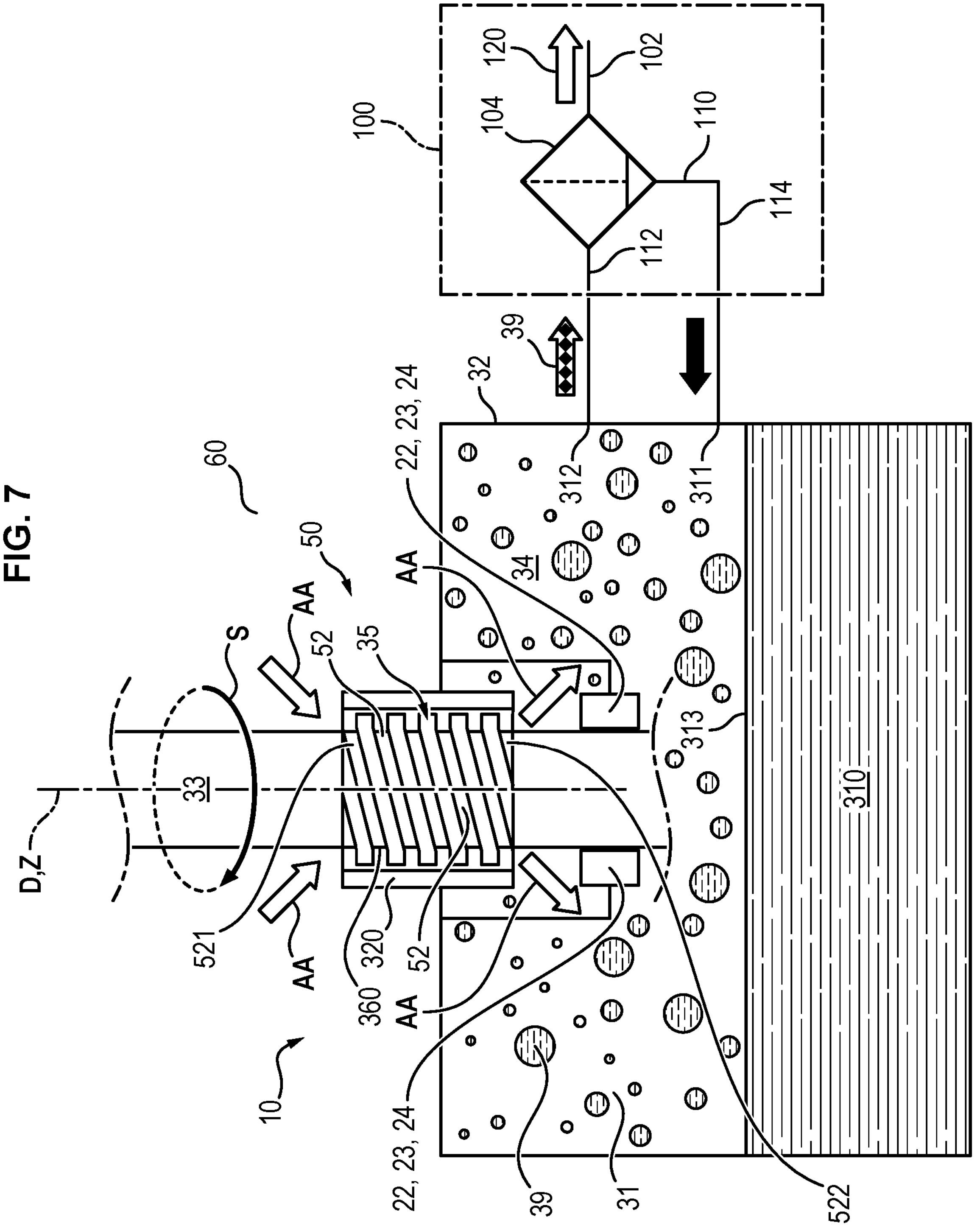
FIG. 7 shows a schematic vertical section view of a part of the rotary machine according to another embodiment of the invention.

This mist 39 circulates along the path B as shown in FIG. 5, said mist 39 diffusing along two paths which separate from one another, the first along an internal leak path FI, the second along an outer leak path F traversing the sealing 35 and generating an outer global flow M loaded with oil which the present invention proposes to limit or eliminate owing to the dynamic control of the leak F.

Figure 2:
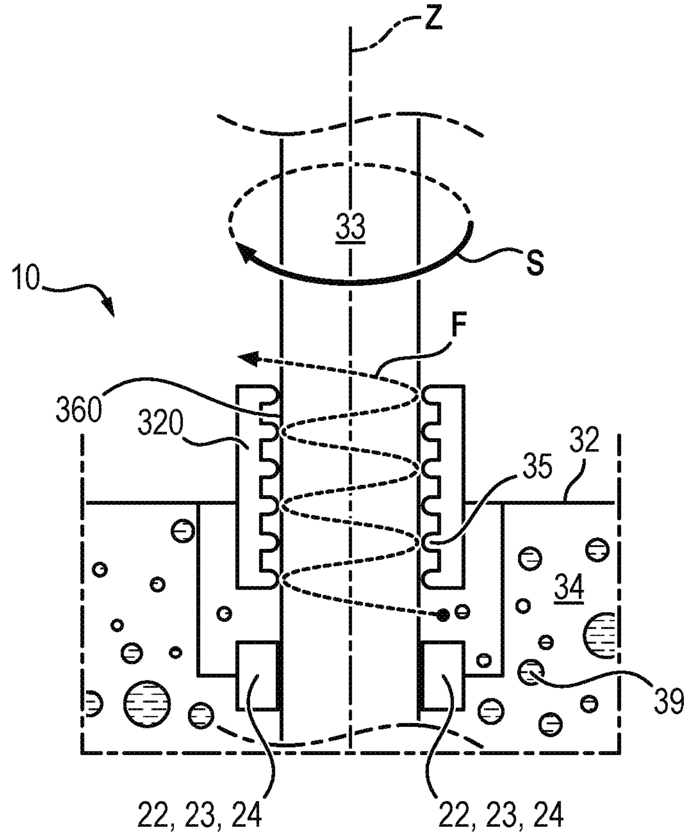
Prior Art FIG. 2
FIG. 2 shows an enlarged schematic vertical section view of the known rotary machine of FIG. 1.

In the prior art of FIGS. 1 and 2, the dynamic seal between the oil casing 32 and the rotary part 360 of the rotary machine 10 is ensured by a baffle-labyrinth system 35. This sealing device 35 has the aim of avoiding transfers of oil mist/vapor 39 from the inside of the casing 32 to the outside 60 of the casing 32.

However, in the prior art of FIGS. 1 and 2, the pressure fluctuations and air circulations related to the operation of the rotary machine 10, particularly the rotation of the shaft 33, allow the air 34 loaded with oil 39 to migrate by diffusion and traverse the dynamic sealing 35 in place, as illustrated by the arrows M shown in FIG. 1. The air 34 loaded with oil 39 is released along the arrows M in the environment 60 of the rotary machine 10 and will give rise to undesirable pollution via the oil on different surfaces and equipment items near the rotary machine 10 outside the compartment 31 of the casing 32. In the case of the primary motor-pump assembly 2 of FIGS. 3 to 5, this phenomenon is accentuated by the presence of the inertia flywheel 36, and this air 34 loaded with oil 39 is then ejected to the outside 60 of the rotary machine 10 via the ventilation holes 37 of the protective casing 38 of the inertia flywheel 36 of the rotary machine 10.

The present invention aims to limit or even eliminate all these drawbacks by proposing an installation ensuring dynamic sealing on rotary machines 10 in operation, by means of an installation incorporated as soon as these rotating machines 10 are manufactured and implemented. The invention aims to significantly reduce oil leaks M via oil spray/mist released into the atmosphere by the rotary machines 10 requiring lubrication of FIGS. 6 to 12, such as for example the water circulation pump motors used in nuclear power plants according to FIGS. 3 to 5.

According to the invention, as illustrated in FIGS. 6 to 12, the oil-sealing device 35 comprises at least one grooving 52 for outer air suction in the direction S of rotation of the shaft 33. According to an embodiment of the invention, illustrated in FIGS. 7 and 8, the grooving 52 is located in the rotary part 360 secured to the shaft 33.

According to another embodiment of the invention, illustrated in FIGS. 6 and 8 to 12, the grooving 52 is located in the upper part 320 of the casing 32, surrounding the rotary part 360 secured to the shaft 33. This grooving 52 in the static part 320 is typically well-adapted to upgrades of existing machines, for example the primary pump motors, due to the reduction of the modifications to be made to the machine and to the non-creation of any mechanical imbalance.

Figure 8:
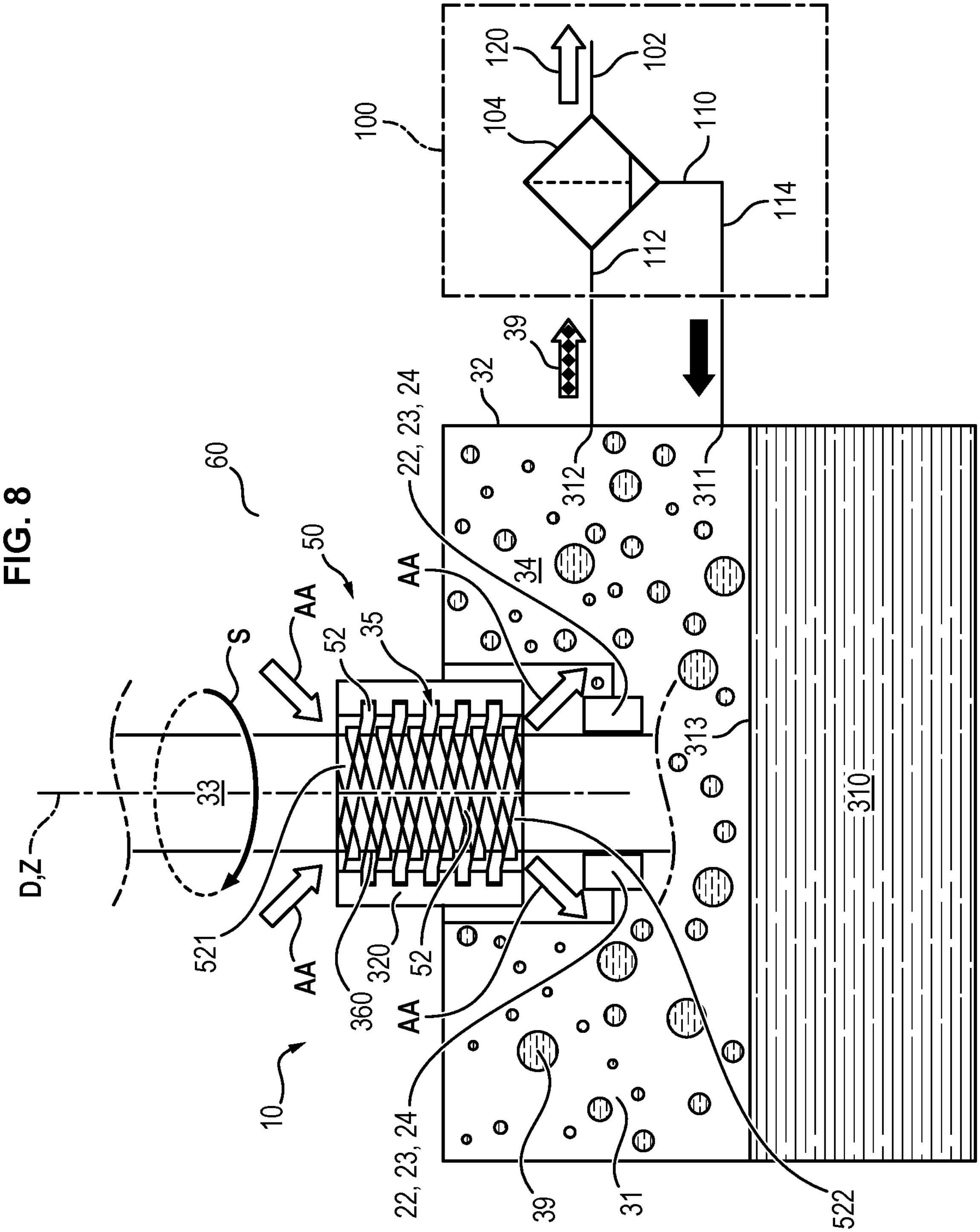
FIG. 8 shows a schematic vertical section view of a part of the rotary machine according to an embodiment of the invention.
Figure 10:
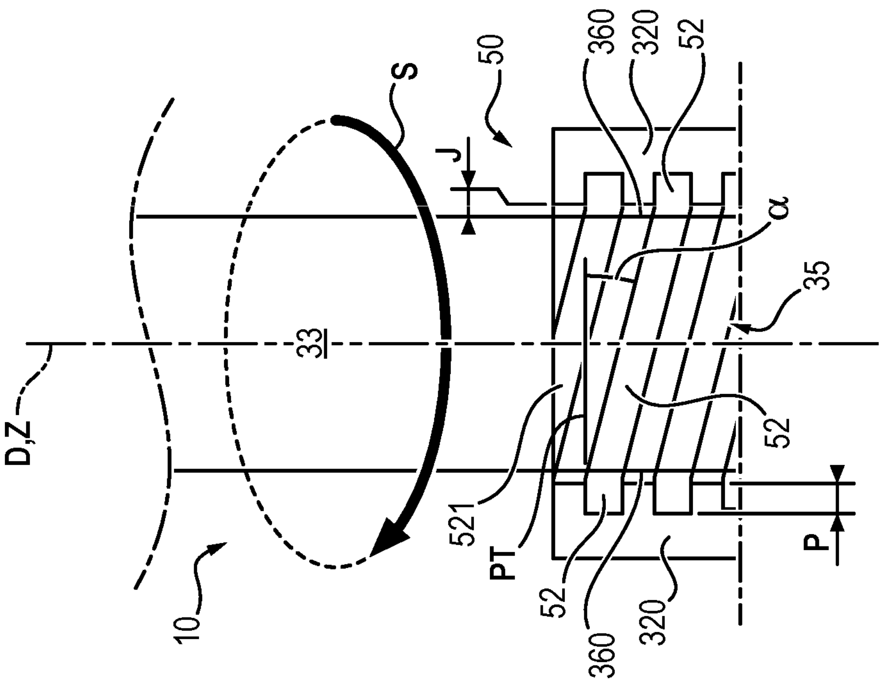
FIG. 10 shows an enlarged schematic vertical section view of a part of the rotary machine according to the embodiment of the invention of FIG. 6.
Figure 9:
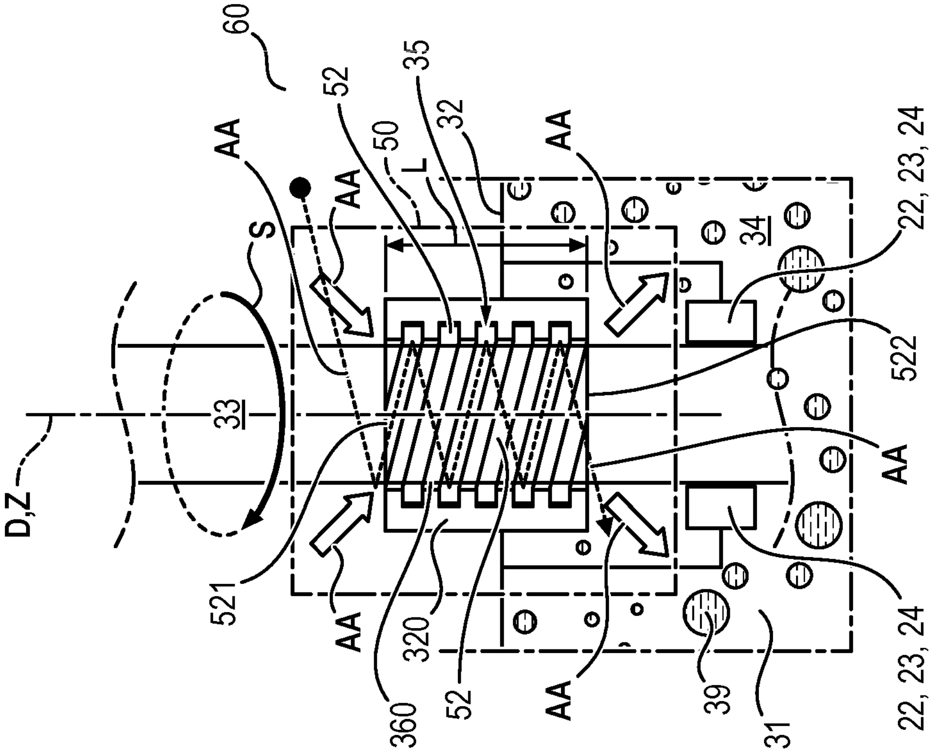
FIG. 9 shows an enlarged schematic vertical section view of a part of the rotary machine according to the embodiment of the invention of FIG. 6.

According to another embodiment of the invention, illustrated in FIG. 8, the grooving 52 is located both in the rotary part 360 secured to the shaft 33 and in the upper part 320 of the casing 32, surrounding the rotary part 360 secured to the shaft 33.

Provision can be made for one or more grooves in the grooving 52.

According to the invention, as illustrated in FIGS. 6 to 12, the rotary part 360 (or rotor part) secured to the shaft 33 does not touch the upper 320 (or stator) part of the casing 32, the grooving 52 being located between the rotary part 360 secured to the shaft 33 and the upper part 320 of the casing 32. Thus, the oil-sealing device 35 has no contact in the passage 50 of the shaft 33 in the casing 32.

According to the invention, as illustrated in FIGS. 6 to 12, the grooving 52 extends from an air suction upstream end 521 of the rotary part 360 and/or of the upper part 320 of the casing 32 to an air ejection downstream end 522 of the rotary part 360 and/or of the upper part 320 of the casing 32. The air suction upstream end 521 is located on the side of an air communication opening 37, 370 of the rotary machine 10 communicating with the outside 60. The air injection downstream end 522 is in communication with the compartment 31 of the casing 32. The air communication opening 370 communicating with the outside 60 is located between the rotary part 360 secured to the shaft 33 and the upper part 320 of the casing 32.

According to the invention, the outside air suction grooving 52 is configured (oriented) to suction air (arrows AA in FIGS. 6, 7, 8, 9 and 11) from the upstream end 521 to the downstream end 522, i.e. from the air communication opening 37, 370 toward the compartment 31, when the shaft 33 is rotating in the prescribed direction S of rotation.

Thus, this invention then improves the current prior art represented by FIGS. 1 and 2, in that the installation according to the invention, as illustrated in FIGS. 6 to 12, makes it possible to discharge the oil mist 39 in the compartment 31 to be forced back by the suctioned air AA, to move this oil mist 39 away from the interstice located between the rotary part 360 and the upper part 320 of the casing 32 and to push it toward the air filtering device 100, and is combined with the incorporation of an autonomous device 35 during the rotation of the shaft 33 in the prescribed direction S of rotation to set in motion and push the air flows 39 loaded with oil toward the air filtering device 100, owing to one (or more) parts 360 and/or 320 having one (or more) grooves 52 instead of the labyrinth of the prior art of FIGS. 1 and 2. This allows the catching of the oil mist 39 toward the air filtering device 100. This can be done by dispensing with an extractor fan 101 in FIGS. 6 to 10 and 12. The outer air suction grooving 52 makes it possible to suction and speed up the clean air located on the outside 60 of the area to be sealed (here the bearing) to inject it into the oil compartment 31 and to make a barrage against the rising of oil mist 39 present in the oil compartment 31. Thus, the invention makes it possible to recover a greater quantity of oil droplets/vapor 39 and to return condensate of this recovered oil 39 into the area to be sealed (bearing) or into the oil compartment 31 to re-use it. The device 100 makes it possible to reprocess a greater quantity of incoming air to rid it of its oil 39 and evacuate the clean air out of the rotary machine 10. The invention uses the rotation of the shaft 33 in the prescribed direction S of rotation to create the suctioned barrage air flow AA. The sealing of the device 35 and the speeding up of the suctioned air AA is done by a single part 52 which is instead and in place of the labyrinth seals conventionally used on rotary machines 10. Thus, the sealing device 35 is autonomous: it is not necessary to electrically or mechanically power the system (beneficial for isolated machines, considerable reduction in installation and maintenance costs, no pipes, no outgoing power lines). The fact that the sealing device 35 has no contact between the stator part 320 and the rotor part 360 is advantageous, since there is no mechanical wear, nor influence on the dynamic behavior of the shaft line (vibration etc.), and there is no maintenance to be done on the dynamic sealing device 35 (except for the monitoring of the filter clogging and the replacement of the filters which are conventional consumables). The addition of the venting system 100 makes it possible to guarantee a total sealing of the passage 50 of the shaft, while ensuring a minimum flow rate of the incoming fluid AA. This minimum flow rate is a function of several parameters (clearance J between rotor and stator, rotation speed, diameter to be sealed etc.) According to an embodiment of the invention, for the primary pump motors 28, it is in the order of a hundred liters/minute.

In the case of the primary motor-pump assembly 2 of FIGS. 3, 4, 5 and 12, the invention makes it possible to solve the problems of oil leaks via spray from the bearings 22, 23, 24 of the primary pump motors 28 forming rotary machines 10. In the prior art, during shutdowns of tranches of the nuclear power plant, the undesirable presence of oil has been detected on the primary pump motors (cowl holes 38 of the flywheel 36, oil collection trays, air coolers, primary pump motor support, etc.) and their environments (wall of reactor building, thermal insulation, gratings etc.) The need that must be met is the non-contamination of the environment of the primary pump motor, to reduce the costs of maintenance and running (cleaning, replacement of dirty components, waste management, dosimetry: these costs generated by the leaks can amount to 20 k€/year/tranche and up to 80 k€ if the thermal insulation of the main primary circuit was contaminated), in order to reduce the risk of accidents related to the migration of oil onto sensitive components (sensors etc.), and to secure the installations: reduction of the risk of falling on the same level, reducing the time of human operations relating to these leaks. The improvement provided by the invention makes it possible to guarantee the confinement of the oil inside the casing 32 and the bearings of the motor, while taking into account the following (non-comprehensive) limitations without adding any notable maintenance operations, or modifying the operating behavior of the machine: primary pump motor with vertical shaft, diameter of the shaft at the bearing of approximately 440 mm, nominal rotation speed of the shaft of 1485 rpm, fluid to be sealed: grade 46 mineral oil in the form of projection or vapor at a temperature between 10 and 80° C., number of running hours of a primary pump motor of approximately 8000 hours/year (constant running), duration between two general motor maintenances over 25 years, ambient conditions of the motor (atmosphere of the reactor building): pressure of 1±0.2 bar absolute, relative humidity of 50%, radiation level of 0.5 Gy/h, normal ambient temperature between 10 and 45° C.

According to an embodiment of the invention, illustrated in FIGS. 1 to 12, the rotary shaft 33 is vertical and is able to rotate in the prescribed direction S of rotation around the direction D of extension of the shaft 33, which is the vertical direction Z.

In the remainder of the text, reference will be made to a rotary machine 10 with a rotary shaft 33 shown along a vertical axis D, Z—i.e. along an angle of 90 degrees with respect to a horizontal plane—, however the scope of the invention relates to any type of rotary machine whatever the spatial orientation of the axis D of rotation, which can also be between 0 and 90 degrees with respect to said horizontal plane.

According to an embodiment of the invention, illustrated in FIGS. 5 to 12, the air suction upstream end 521 is an air suction upper end 521. The air ejection downstream end 522 is an air ejection lower end 522.

According to an embodiment of the invention, illustrated in FIGS. 5 to 12, the outside air suction grooving 52 is continuous from the air suction upstream end 521 to the air ejection downstream end 522.

According to an embodiment of the invention, illustrated in FIGS. 5 to 12, the outside air suction grooving 52 is inclined by a predetermined non-zero angle α with respect to a plane PT transversal (normal) 33 and to the direction D and extends around the direction D of extension of the shaft 33, around which the shaft 33 is able to rotate in the prescribed direction S of rotation. For example, in the case where the direction D of the shaft 33 is vertical, the plane PT is horizontal. According to an embodiment of the invention, illustrated in FIGS. 5 to 12, the predetermined angle α with respect to the transversal plane PT is between 0 and 60°, particularly between 1° and 45°, for example between 1° and 25°. The number of grooves of the grooving 52 connecting one after another along the direction D, their depth P in the transversal plane PT, their shape, their angle α with the normal to the direction D of extension, the length L of the sealing device 35 along the direction D of extension and the radial clearance J (in the direction of the transversal plane PT, starting from the direction D) between the outer diameter of the rotary part 360 and the inner diameter of the upper part 320 are a function of the geometry of the area 50 to be sealed and of functional parameters of the machine (vibration level, clearances at the bearings etc.) According to an embodiment of the invention, on the primary pump motors 28, the number of grooves is between 1 and 150, the depth P of the grooves 52 is between 0 and 30 mm, the angle α of the grooves with respect to the normal to the direction D of extension is between 0 and 60°, the length L of the sealing device 35 along the direction D of extension is between 0 and 200 mm, and the radial clearance J between the outer diameter of the rotary part 360 and the inner diameter of the upper part 320 is between 0 and 6 mm.

According to an embodiment of the invention, illustrated in FIGS. 5 to 12, the outer air suction grooving 52 is in the form of a threading from the air suction upstream end 521 to the air ejection downstream end 522 in the prescribed direction S of rotation. This can be a particular implementation of the predetermined angle α, of the number of grooves (each groove being in this case a thread making one turn around the direction D and the grooves being connected to one another along the direction D), of the depth P, of the length L and of the clearance J.

According to an embodiment of the invention, illustrated in FIGS. 5 to 12, the outer air suction grooving 52 is helical. This can be a particular implementation of the predetermined angle α, of the number of grooves (each groove being in this case a thread making one turn around the direction D and the grooves being connected to one another along the direction D), of the depth P, of the length L and of the clearance J.

According to an embodiment of the invention, illustrated in FIGS. 6, 7, 8, 12 and 13, the device 100 for filtering the air of the compartment 31 and discharging the air to the outside 60 of the compartment 31 comprises an air inlet 112 connecting an air outlet 312 of the compartment 31 to a filter 104, for example coalescing. The filter 104 filters the air 34 loaded with oil arriving at the air inlet 112 to separate the oil 39 and the air and send the oil 39 thus recovered to its filtered oil outlet 110, then to the compartment 31 by an oil duct 114 connecting the oil inlet 311 of the compartment 31 to this filtered oil outlet 110. The filter 104 sends the filtered air 120 to its filtered air ejection outlet 102, which is vented to the outside 60 of the compartment 31. The air filtering device 100 thus makes it possible to vent the oil 310 compartment 31, to filter the air 34 in the oil compartment 31, to separate the air 34 from its oil droplets/vapor 39, to restore to the outside 60 of the casing 32 the air 120 rid of its oil 39, and to return the oil condensate 39 extracted from the air 34 to the volume 310 of liquid oil of the compartment 31 via the outlet 110 and the inlet 311. The air 34 loaded with oil 39 and particles coming from the oil 310 compartment 31 passes through the filtering medium 150 of the filter(s) 104. The oil droplets and vapor 39 are separated from the air by the filtering medium 150. Once separated, the oil droplets 39 agglomerate into larger oil drops and descend under gravity along the arrow G in the filter 104. The return of this oil condensate 39 to the oil 310 compartment 31 via the oil return system 110, 311 is characterized by the fact that it prevents the air 34 loaded with particles, located in the casing 32 to be sealed, from circumventing the filter or filters 104 of the filtering system 100. For example, the oil inlet 311 is located above the oil level 313 of the volume 310 of liquid oil in the compartment 31; thus the return of the oil condensate 39 via this inlet 311 is done above this level 313, in order to reduce the possible leakage points. The air 120 exiting the filtering element or elements 150 is decontaminated of its oil 39 and is evacuated into the environment 60 of the rotary machine 10. The number of filters 104 equipping the venting device 100 is a function of several parameters, comprising in particular the performance of the sealing device 35, the level of contamination with particulate and oil 39 of the air 34 located in the compartment 31, of the anticipated maintenance intervals, of the characteristics of the filters 104 (load loss, oil separation efficiency etc.)

Figure 11:
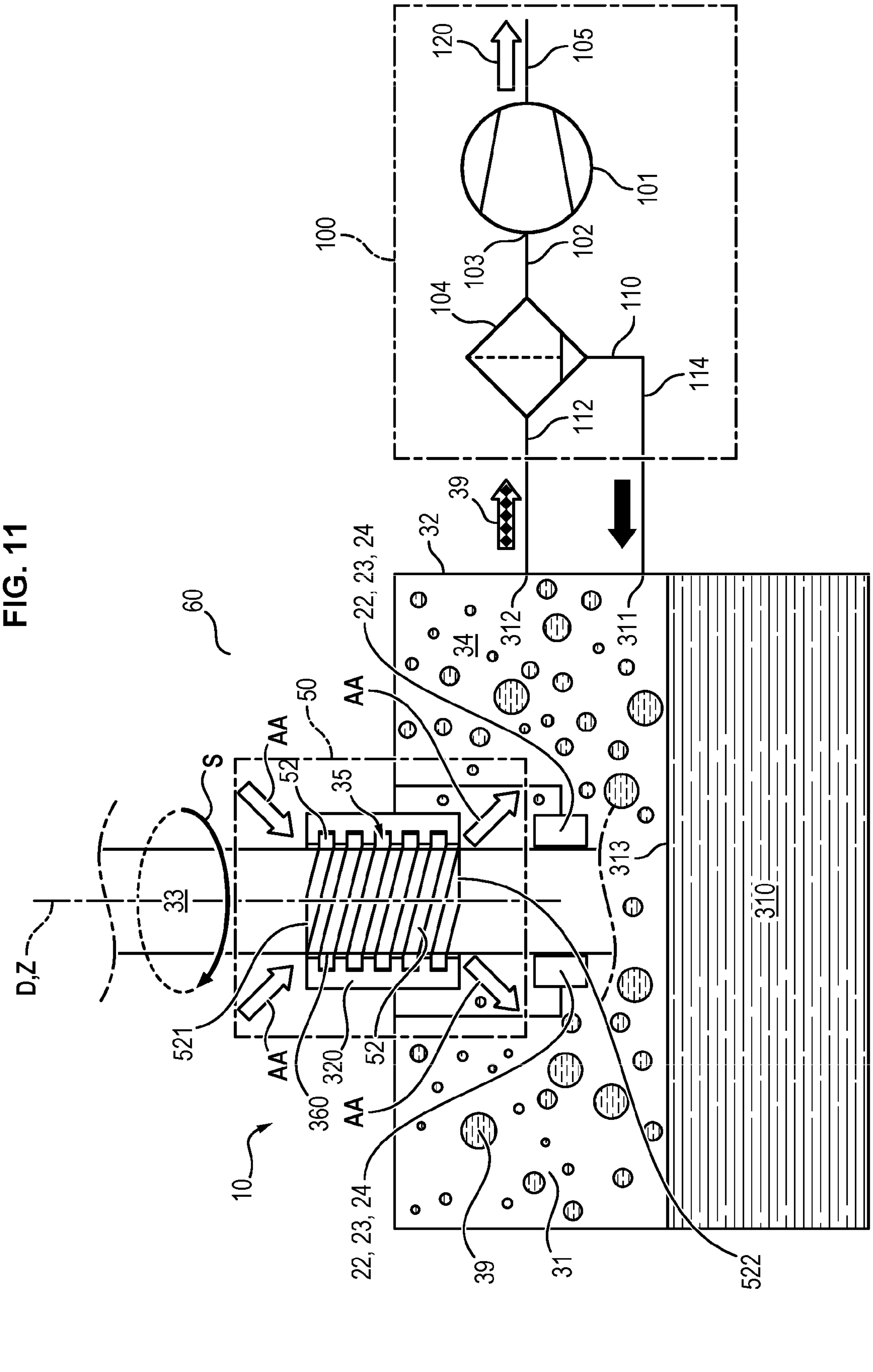
FIG. 11 shows an enlarged schematic vertical section view of a part of the rotary machine according to another embodiment of the invention.

According to another embodiment of the invention, illustrated in FIG. 11, the device 100 for filtering the air of the compartment 31 and discharging the air to the outside 60 of the compartment 31 comprises an air inlet 112 connecting to an air outlet 312 of the compartment 31 to a filter 104, for example coalescing. The filter 104 filters the air loaded with oil arriving at the air inlet 113 to separate the oil and air and send the oil thus recovered to its filtered oil outlet 110, then to the compartment 31 through an oil duct 114 connecting the oil inlet 311 of the compartment 31 to this filtered oil outlet 110. The filter 104 sends the filtered air to an air extraction motor-fan 101, the first filtered air ejection outlet 102 of the filter 104 being connected to an air suction inlet 103 of the air extraction motor-fan 101, comprising a second air ejection outlet 105 is vented to the outside 60 of the compartment 31. Of course, this embodiment can be combined with the different embodiments of the grooving 52.

In general, in the embodiments of FIGS. 6 to 13, this innovation brings improvements to the most effective technique at the present time, since the dynamic sealing system 35 of the invention is, for an equivalent load loss, more effective in terms of oil leakage rates than the labyrinth seal device conventionally used. This can therefore make it possible to reduce the power of the motor-fan 101 and thus to reduce the installation and operating costs, or to improve the oil leakage rate of the shaft 33 for a design of the same motor-fan 101 power. In the event of a situation in which the sealing device 35 makes it possible to set in motion and create an air flow with sufficient pressure and flow rate characteristics, the implementation of the motor-fan 101 will be useless, or even unnecessary in the installation.

This type of configuration could thus be found, for example, in demanding conditions (very low level of contamination at the shaft outlet), or specific cases (for example reducing the installation and operating costs (with for example the reduction of the power or even absence of the motor-fan 101)). The sealing device 35 according to the invention could be installed anywhere the peripheral shaft speeds 33 are high and where oil leaks are penalizing.

Figure 13:
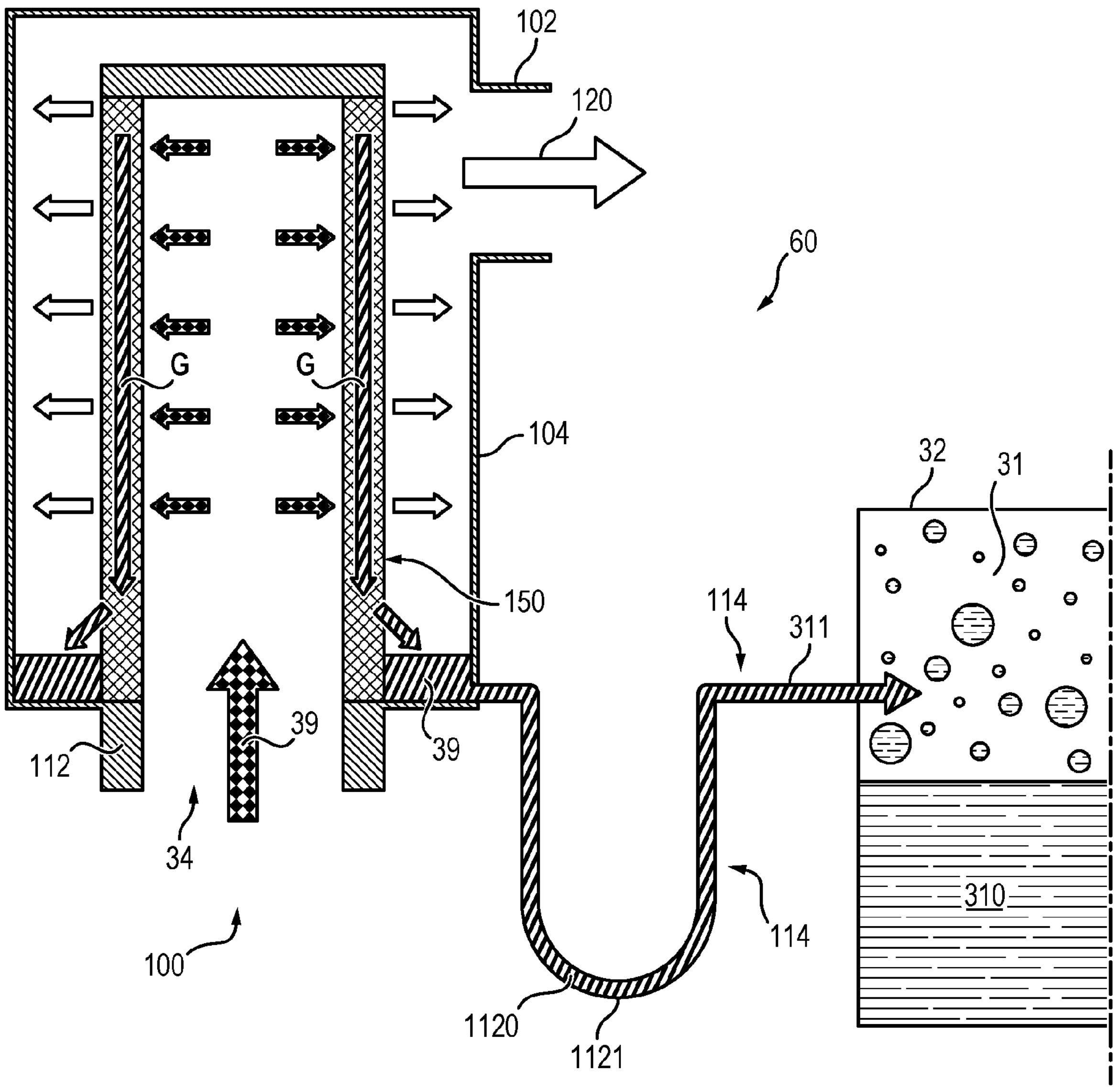
FIG. 13 shows a schematic vertical section view of a part of an air filtering device of the rotary machine according to an embodiment of the invention.

According to an embodiment of the invention, illustrated in FIG. 13, the filtered oil outlet 110 is connected to the oil inlet 311 of the oil 310 compartment 31 by way of at least one oil duct 114 comprising at least one gooseneck 1120 (or syphon 1120) oriented downward. Thus, the gooseneck 1120 or syphon 1120 has a lower part 1121 (or bottom 1121) filled with oil in the duct 114, which prevents the sending of air to the inlet 311 of the compartment 31. This gooseneck 1120 can be, for example, in the shape of a U, or another shape. The gooseneck 1120 or syphon 1120 guarantees the blocking of the air 34 contained in the oil compartment 31 owing to the presence of oil in the bottom 1121 of the gooseneck 1120 or syphon 1120.

Figure 12:
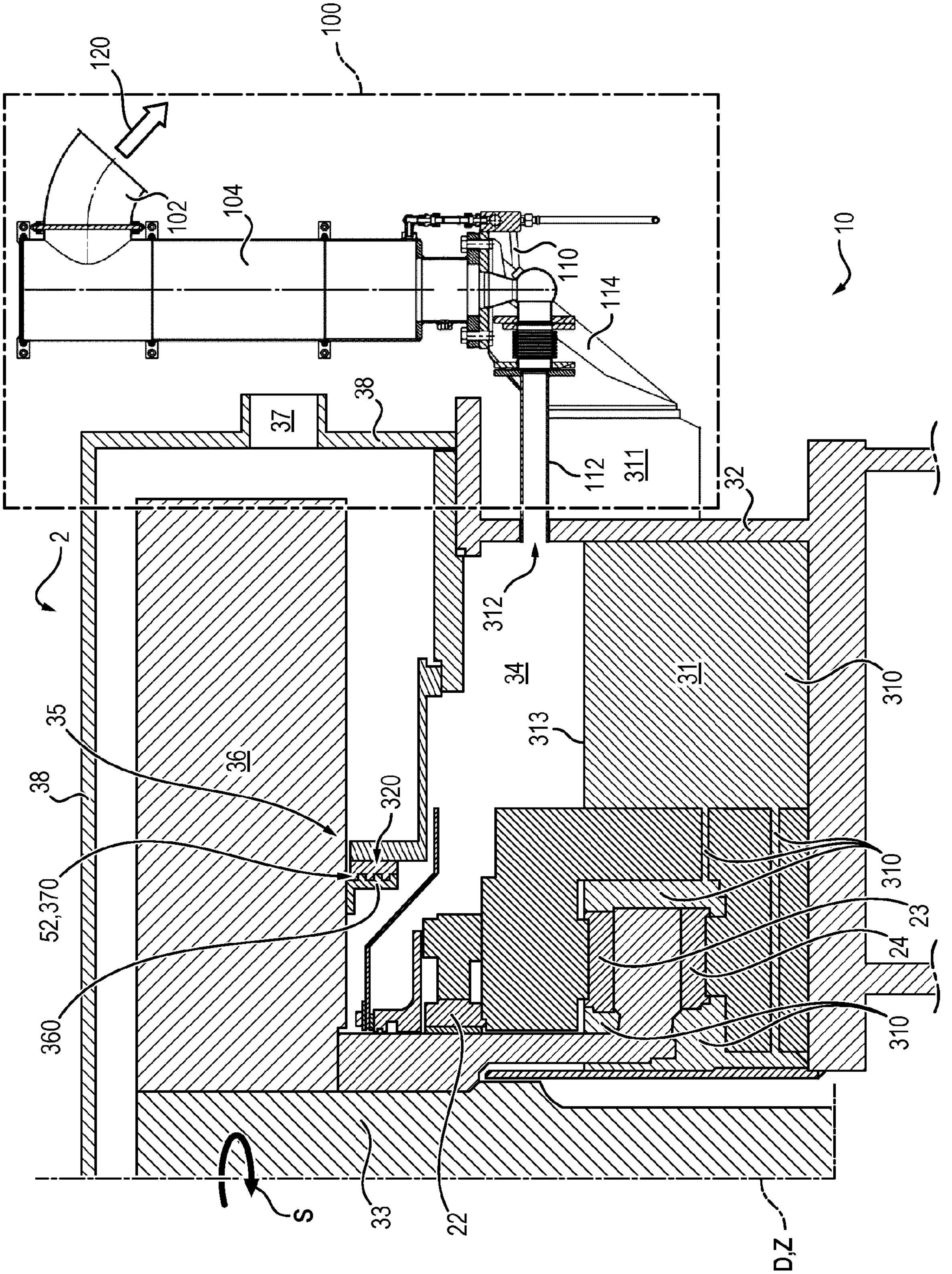
FIG. 12 shows a schematic vertical section view of a part of the rotary machine of FIG. 4 according to an embodiment of the invention.

According to an embodiment of the invention, illustrated in FIG. 12, the rotary part 360 is an annular wall secured to the inertia flywheel 36 and extending around the rotary shaft 33. The inertia flywheel 36 transversally projects past the direction D of extension of the shaft 33. The rotary part 360 can be formed by an annular part that can take the form of a ring attached under the inertia flywheel 36. The upper part 320 of the casing 32 is located at a distance under the inertia flywheel 36. The sealing device 35 according to the invention is located at a distance under the inertia flywheel 36.

Of course, the embodiments, features, possibilities and examples described above can be combined with one another or be selected independently from one another.

The invention claimed is:

1. A rotary machine, comprising a casing, at least one rotary shaft rotary along a prescribed direction of rotation, at least one guide bearing, which is mounted in the casing and in which the at least one rotary shaft is rotatably mounted, the casing delimiting a compartment configured to contain a volume of air and a volume of lubrication oil to lubricate the at least one guide bearing, the rotary machine comprising a rotary part, fixed in rotation to the at least one rotary shaft and surrounded by an upper part of the casing transversally to the at least one rotary shaft and distant from the at least one guide bearing, an oil-sealing device, located between the at least one rotary part and the upper part of the casing, and a device for filtering the air of the compartment and discharging the air to the outside of the compartment, wherein the oil-sealing device comprises at least one outside air suction grooving in the prescribed direction of rotation of the at least one rotary shaft, the at least one outside air suction grooving being located in the rotary part and/or in the upper part of the casing, the rotary part having no contact with the upper part of the casing, the at least one outside air suction grooving extending from an air suction upstream end, of the rotary part and/or of the upper part of the casing, to an air ejection downstream end, of the rotary part and/or of the upper part of the casing, the air suction upstream end being located on a side of an air communication opening of the rotary machine with the outside and the air ejection downstream end being in communication with the compartment, the at least one outside air suction grooving being configured to suction air from the air suction upstream end to the air ejection downstream end toward the compartment when the at least one rotary shaft rotates in the prescribed direction of rotation.

2. The rotary machine as claimed in claim 1, wherein the at least one rotary shaft is vertical, the air suction upstream end is an air suction upper end, and the air ejection downstream end is an air ejection lower end.

3. The rotary machine as claimed in claim 1, wherein the at least one outside air suction grooving is inclined at a predetermined non-zero angle of inclination with respect to a plane transversal to the at least one rotary shaft and extends around a direction of extension of the at least one rotary shaft, around which the at least one rotary shaft is able to rotate in the prescribed direction of rotation.

4. The rotary machine as claimed in claim 3, wherein the predetermined non-zero angle of inclination with respect to the plane is greater than 0° and less than or equal to 60°.

5. The rotary machine as claimed in claim 3, wherein the predetermined non-zero angle of inclination with respect to the plane is greater than or equal to 1° and less than or equal to 45°.

6. The rotary machine as claimed in claim 1, wherein a depth of the at least one outside air suction grooving in a plane transversal to the at least one rotary shaft is greater than 0 mm and less than or equal to 30 mm.

7. The rotary machine as claimed in claim 1, wherein a length of the at least one outside air suction grooving along a direction of extension of the at least one rotary shaft, around which the at least one rotary shaft is able to rotate in the prescribed direction of rotation, is greater than 0 mm and less than or equal to 200 mm.

8. The rotary machine as claimed in claim 1, wherein the at least one outside air suction grooving comprises a number of grooves greater than or equal to 1 and less than or equal to 150 along a direction of extension of the at least one rotary shaft, around which the at least one rotary shaft is able to rotate in the prescribed direction of rotation.

9. The rotary machine as claimed in claim 1, wherein a radial clearance between the outer diameter of the rotary part and the inner diameter of the upper part is greater than 0 mm and less than or equal to 6 mm.

10. The rotary machine as claimed in claim 1, wherein the at least one outside air suction grooving is in the form of a threading from the air suction upstream end to the air ejection downstream end in the prescribed direction of rotation.

11. The rotary machine as claimed in claim 1, wherein the at least one outside air suction grooving is helicoidal.

12. The rotary machine as claimed in claim 1, wherein the device for filtering the air of the compartment and discharging the air to the outside of the compartment comprises an air inlet connected to an air outlet of the compartment, a filtered oil outlet, connected to an oil inlet of the compartment, and a filtered air ejection outlet, vented to the outside of the compartment.

13. The rotary machine as claimed in claim 12, wherein the filtered oil outlet is connected to the oil inlet of the compartment by way of at least one oil duct comprising at least one gooseneck pointing downward.

14. The rotary machine as claimed in claim 1, wherein the device for filtering the air of the compartment and discharging the air to the outside of the compartment comprises an air inlet connected to an air outlet of the compartment, a filtered oil outlet, connected to an oil inlet of the compartment, and a filtered air ejection outlet, connected to an air suction inlet of a motor-fan for extracting air to the outside of the compartment.

15. The rotary machine as claimed in claim 14, wherein the filtered oil outlet is connected to the oil inlet of the compartment by way of at least one oil duct comprising at least one gooseneck pointing downward.

16. A primary motor-pump assembly, configured to be mounted in at least one pressurized-water primary circuit of a nuclear electrical power production plant, the primary motor-pump assembly comprising a primary pump having a water-pumping wheel, and a rotary machine as claimed in claim 1, the at least one rotary shaft of which is attached to the water-pumping wheel of the primary pump to rotationally drive it.

17. The primary motor-pump assembly as claimed in claim 16, wherein the primary motor-pump assembly comprises an inertia flywheel attached to the at least one rotary shaft, the rotary part is an annular wall secured to the inertia flywheel and extending around the at least one rotary shaft.

* * * * *